United States Patent [19]

Tarallo

[11] Patent Number: 4,879,728

[45] Date of Patent: Nov. 7, 1989

[54] DPSK CARRIER ACQUISITION AND TRACKING ARRANGEMENT

[75] Inventor: Joseph A. Tarallo, Bedminster, N.J.

[73] Assignee: American Telephone and Telegraph Company, AT&T Bell Laboratories, Murray Hill, N.J.

[21] Appl. No.: 304,680

[22] Filed: Jan. 31, 1989

[51] Int. Cl.$^4$ ............................................. H04L 27/22
[52] U.S. Cl. ....................................... 375/80; 329/306; 375/84; 375/85; 375/97
[58] Field of Search ................... 329/50, 105, 107, 110; 375/77, 80, 82, 83, 84, 85, 97

[56] References Cited

U.S. PATENT DOCUMENTS

| | | | |
|---|---|---|---|
| 3,991,377 | 11/1976 | Salazar et al. | 329/105 |
| 4,438,524 | 3/1984 | Muilwijk | 375/80 |
| 4,466,108 | 8/1984 | Rhodes | 375/97 |
| 4,472,817 | 9/1984 | Poklemba et al. | 375/97 |
| 4,757,266 | 7/1988 | Yoshida et al. | 329/50 |
| 4,757,272 | 7/1988 | Okada et al. | 329/50 |

Primary Examiner—Benedict V. Safourek
Attorney, Agent, or Firm—Jack S. Cubert

[57] ABSTRACT

A QDPSK communication receiver includes a frequency source, apparatus for translating a received QDPSK signal having inphase I and quadrature phase Q components to baseband and a baseband demodulator. For each symbol period of the baseband QDPSK signal, a signal ($I_{diff}$) representative of the inphase component of the phase different between immediately successive received symbols and signal ($Q_{diff}$) representative of quadrature phase component of the phase difference between immediately successive received symbols is formed. In order to synchronize the frequency of the receiver frequency source to carried frequency of the received QDPSK signal, a preamble interval is defined during which a sequence of identified symbols is received. The inphase difference component signals of the symbols of the preamble interval are compared with the quadrature difference component signals of the symbols of the preamble interval to generate a plurality of signals representative of a set of predetermined relationships between the inphase difference component signals and the quadrature phase difference component signals. The frequency of the receiver frequency source is adjusted responsive to the plurality of predetermined relationship signals.

32 Claims, 8 Drawing Sheets

DPSK CARRIER ACQUISITION AND TRACKING ARRANGEMENT

FIELD OF THE INVENTION

The invention relates to communication systems employing differential phase shift keying (DPSK) modulation and more particularly to a carrier acquisition and tracking arrangement for a differential phase shift keying demodulator.

BACKGROUND OF THE INVENTION

In digital communication systems, phase shift keying (PSK) is commonly used to modulate a carrier with a multivalued digital signal whereby digital values are represented by predetermined phases of the carrier signal. An Mary phase shift keying arrangement such as quaternary phase shift keying may use the phases $\pi/4$, $3\pi/4$, $5\pi/4$ and $7\pi/4$ in a phase plane representation to represent symbols comprising pairs of digital values or dibits. The demodulator receiving the PSK signal includes its own carrier source operating at the same frequency and phase as the transmitted signal. To properly distinguish between symbol phases in the PSK signal at a receiver, it is essential that the phase of the carrier source in the demodulator be accurately set to that of the received signal. Where the PSK signal is transmitted over a radio channel such as in mobile radio systems, the varying conditions on the channel subject the PSK signal to severe variations in phase and amplitude and fast acting automatic frequency and phase control is required to maintain synchronization between the received signal carrier and the demodulator carrier source.

PSK demodulators require detection of the absolute phase of the PSK signal and generally one coherent detection in which the demodulated carrier signal is regenerated from the received carrier. In this way, changes in phase of the received carrier may be rapidly reflected in the demodulator carrier. Differential phase shift keying (DPSK) modulates a carrier with the changes in phase occurring between successive symbol periods. Synchronization of the demodulator carrier by means of a fast acting coherent detection control arrangement may not be required in DPSK arrangements since the phase difference between symbols can be obtained by mixing the present symbol signal with the preceding symbol signal. If, however, symbol processing is performed at other than the received carrier frequency, it is necessary to initially set the demodulator carrier frequency to that of the received carrier so that there is frequency lock. Such initial synchronization should be completed in a minimum interval to avoid errors in the demodulated symbols.

U.S. Pat. No. 4,757,272 issued to Okada et al July 12, 1988 discloses a four phase PSK demodulator wherein a carrier signal is regenerated from a received signal having a fixed phase data symbol preamble for coherent carrier detection. The demodulator includes an orthogonal demodulating circuit and a remodulating circuit for regenerating the carrier signal which during the preamble transmission period is the data signal from a received modulated signal. The remodulating circuit includes a demodulator having a AFC circuit with a narrow band filter for detecting a frequency change, means for suppressing frequency changes of the received four-phase PSK modulated signal and requires means for rendering the frequency of the regenerated carrier signal passing through the narrow band filter constant. The use of a fixed phase symbol preamble is unsuitable for an MDPSK arrangement in which the absolute data phase is changed every symbol period for a fixed symbol preamble.

U.S. Pat. No. 4,757,266 issued to Y. Yoshida et al July 12, 1988 discloses a demodulation system capable of establishing synchronization in a transient state in which a quadrature amplitude modulated (QAM) signal is demodulated into first and second sets of output digital signals through use of a reference carrier signal. The phase plane for analyzing the first and second sets of digital signals is divided into four quadrants. Each quadrant has a narrow zone defining properly phased signals. An alarm signal is produced in the event a received signal does not fall on particular points within a permitted zone owing to a transient condition and a specific phase control signal is activated to correct the deviation. The arrangement is adapted to recovery from a transient loss of carrier but the narrow zones are not adapted to provide initial carrier acquisition where the deviations from a properly phased signal may be very large. Where modulation is done by phase shifting as in DPSK, however, the arrangement is not suitable.

U.S. Pat. No. 4,438,524 issued Mar. 20, 1984 to D. Muilwijk discloses a receiver for angle modulated carrier signals using non-coherent detection in which demodulated quadrature components of a signal are analyzed in a logic circuit arranged to set a phase determining threshold and to obtain a value of the instantaneous phase of the currently occurring data symbol. While the teaching of the patent is suitable for fast data acquisition, it is specifically adapted for a tamed FM modulation scheme rather than a DPSK system and does not include control arrangements for the demodulator-oscillator frequency. Further, the circuit arrangements which require setting a threshold for each symbol period based on a plurality of previously detected symbols are relatively complex.

Cellular telephone uses narrow channels in the relatively high frequency band between 800 and 900 mHz. At the high carrier frequencies used, a small deviation in frequency causes phase changes that are not tolerable for demodulation arrangements operating at an intermediate frequency or baseband. The subscriber equipment for cellular telephone must provide the needed frequency accuracy but should be inexpensive and rugged for portable operation in an uncontrolled environment. Consequently, it is desirable to convert signals to a lower intermediate frequency or baseband for processing and to avoid an accurate but expensive frequency source. It is an object of the invention to provide improved intermediate frequency or baseband DPSK demodulation with rapid carrier frequency acquisition and frequency tracking at low cost.

SUMMARY OF THE INVENTION

The foregoing object is achieved by providing a preamble interval in which a fixed symbol type is received by a DPSK demodulator. Signals representing the phase differences between successive symbols in the preamble are formed and the frequency of the demodulator carrier source is modified according to the relative values of the inphase and quadrature components of the phase difference signals.

The invention is directed to an arrangement for setting and tracking the frequency of a receiver frequency source for an MDPSK type demodulator to that of a received MDPSK signal having inphase I and quadrature phase Q components in which a symbol preamble interval is defined during which a sequence of prescribed symbols is received. Signals representative of the inphase component of the phase differences between immediately successive received symbols and the quadrature component of the phase differences between immediately successive received symbols are produced and at least one signal indicative of the values of the inphase I component phase difference signals relative to the values of the quadrature phase Q component phase difference signals in the preamble interval is generated. The frequency of the demodulator frequency source is set responsive to the at least one relative value indicative signal.

According to one aspect of the invention, the frequency of the demodulator carrier frequency source is tracked for synchronization with the received carrier signal by partitioning the MDPSK signal into groups of K symbols and comparing the inphase I phase difference component signal of each successive symbol with the quadrature phase Q phase difference component signal to form a plurality of signals each representative of a prescribed relationship between the inphase I phase difference component of the symbol and the quadrature phase Q phase difference component of the symbol. A signal corresponding to the difference between the receiver frequency source and the frequency of the MDPSK signal carrier is generated responsive to the plurality of prescribed relationship signals for each group of K symbols which frequency difference signal is used to adjust the the frequency of the receiver frequency source.

DETAILED DESCRIPTION

Figure 1:
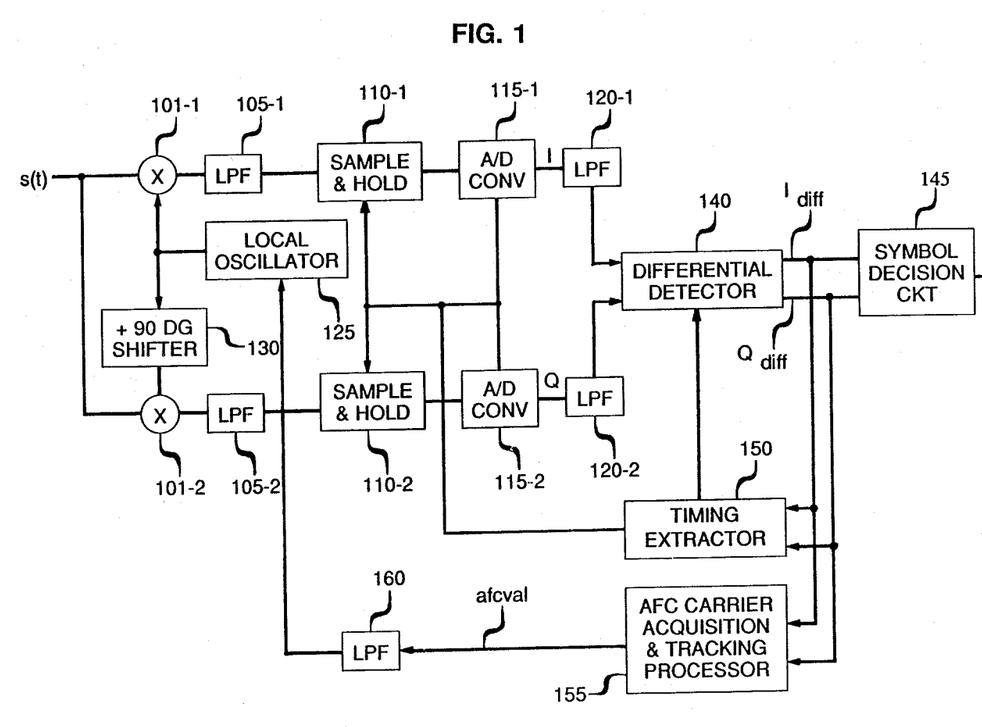
FIG. 1 depicts a QDPSK demodulator circuit illustrative of the invention.

FIG. 1 shows a block diagram of a quaternary differential phase shift (QDPSK) demodulator illustrative of the invention. As is well known in the art, quarternary phase shift keying is a form of phase modulation in which a digital stream is partitioned into symbols 00, 01, 10, and 11. The amplitude of the modulated carrier may be constant or shaped to minimize intersymbol interference and each symbol is assigned to a different quadrant of a phase plane. In a QDPSK arrangement, the difference between successive symbols is encoded as a prescribed phase shift $\pi/4$, $3\pi/4$, $5\pi/4$ or $7\pi/4$ instead of encoding each symbol type as a prescribed phase. A prescribed carrier phase shift of $\pi/4$ indicates no change between successive symbols, e.g., 00, 00. A change such as 00, 01 is indicated by a carrier phase shift of $3\pi/4$ radians/sec. Similarly, a phase shift of $5\pi/4$ radians/sec results from the sequence 00, 11 and a phase shift of $7\pi/4$ radians/sec is obtained from a 00, 10 sequence. In order to demodulate a received signal, it is only necessary to determine the phase shift from symbol period to symbol period so that coherent carrier detection required to determine the absolute phase of the received signal as in PSK arrangements may be avoided.

Figure 2:
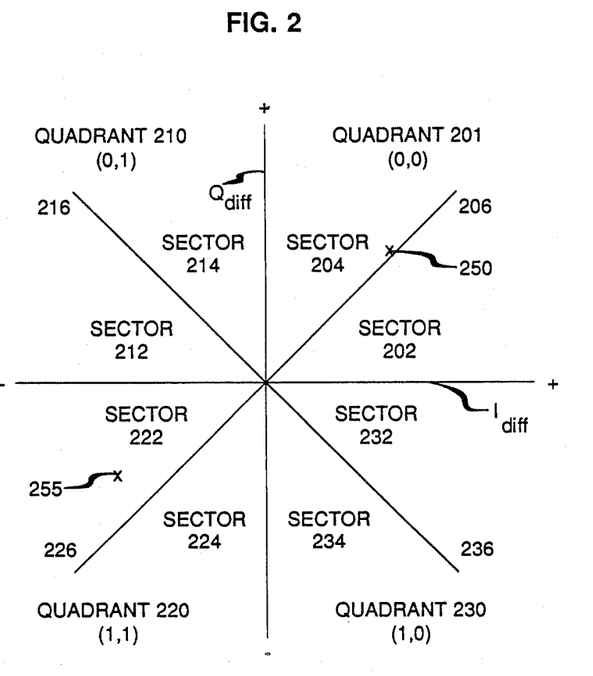
FIG. 2 is a representation of a phase shift plane illustrating the operation of the circuit of FIG. 1.

FIG. 2 shows a phase shift plane representation illustrating the QDPSK coding arrangement where the amplitude of the differential inphase or $I_{diff}$ component is represented along the horizontal axis and the quadrature phase or $Q_{diff}$ component of the symbol is represented along the vertical axis. Each symbol has an inphase differential component which may be a 0 or a 1 and a quadrature component which may be a 0 or a 1. The resulting dibit is a sequence of two binary digits, e.g., 0,0 where the first bit is $Q_{diff}$ component and the second bit is the $I_{diff}$ component. In the phase plane of FIG. 2, the amplitude of a 0 bit symbol component is ideally 1 and the amplitude of a Q bit symbol component is ideally 1. A 0,0 symbol corresponds to a phase shift of $\pi/4$ and is represented on the phase shift plane as point 250 along line 206 in the quadrant 201. A 0,1 symbol corresponds to a phase shift of $3\pi/4$ and is represented on the phase shift plane as a point along line 216 in the quadrant 210. A 1,1 symbol corresponds to a phase shift of $5\pi/4$ and is represented on the phase shift plane as a point along line 226 in the quadrant 220 and a 1,0 symbol corresponds to a phase shift of $7\pi/4$ and is represented on the phase shift plane as a point along line 236 in the quadrant 230. These points fall on lines 206, 216, 226 and 236 in FIG. 2 only if the received signal carrier frequency is the same as the local oscillator frequency. Differences between the received signal carrier frequency and the local oscillator frequency cause shifts in the points in FIG. 2 which shifts may place the points in different quadrants than intended.

FIG. 1 shows a block diagram of a quaternary differential phase shift demodulator illustrative of the invention adapted to determine the symbols of a QDPSK signal at baseband. It is to be understood that the same principles apply to other MDPSK schemes. While a baseband operation is illustrated, it is to be understood that the same principles also apply to operation at an intermediate frequency band other than baseband. Local oscillator 125, mixers 101-1 and 101-2, 90 degree phase shifter 130 and low pass filters 105-1 and 105-2 cooperate to form the inphase and quadrature phase baseband components of a received signal s(t). Sample and hold circuits 110-1 and 110-2, A/D converters 115-1 and 115-2, and low pass filters 120-1 and 120-2 are used to form well shaped digital versions of the baseband I and Q components of the successive symbol periods of signal s(t). Differential detector 140 which may comprise a circuit or a programmed microprocessor operative to produce signals $I_{diff}$ and $Q_{diff}$ corresponding to the phase shift between successive symbols. Symbol decision circuit 145 is adapted to generate the dibit sequence of the QDPSK signal s(t) and timing extractor 150 generates the pulses required to sample the successive symbols. In accordance with the invention, the frequency produced by local oscillator 125 is controlled to synchronize the frequency of the received signal s(t) by AFC carrier acquisition and tracking processor 155 and low pass filter 160.

Referring to FIG. 1, a received signal $$s(t) = \sum_n g(t - nT)\cos(\omega_c t + \phi_n) \tag{1}$$

where
  T is the symbol period,
  $g(t-nT)$ is the amplitude of the nth symbol pulse at time t,
  $\omega_c$ is the received signal radian carrier frequency or an intermediate frequency where used, and
  $\phi_n$ is the phase assigned to the nth symbol
is applied to mixer 101-1 and mixer 101-2. Local oscillator 125 generates a signal $$lc(t) = \cos(\omega_c t + \theta) \tag{2}$$

where $\theta$ is the absolute phase offset between the received signal and the local oscillator signal which is applied directly to mixer 101-1. The local oscillator signal lc(t) is processed in 90 degree phase shifter 130 to form a signal $$ls(t) = \sin(\omega_c t + \theta) \tag{3}$$

which is applied to mixer 101-2. The output of mixer 101-1 is $$I(t) = \sum_n g(t - nT)\cos(\omega_c t + \phi_n)\cos(\omega_c t + \theta) \tag{4}$$

corresponding to the inphase I portion of the received signal and a component $$Q(t) = \sum_n g(t - nT)\sin(\omega_c t + \phi_n)\sin(\omega_c t + \theta) \tag{5}$$

corresponding to the quadrature phase Q portion of the received signal is obtained from mixer 101-2. The inphase signal I at the output of low pass filter 105-1 becomes $$I_{lpf}(t) = 1/2 \sum_n g(t - nT)\cos(\phi_n - \theta) \tag{6}$$

while the quadrature phase signal at the output of low pass filter 105-2 becomes $$Q_{lpf}(t) = -1/2 \sum_n g(t - nT)\sin(\phi_n - \theta). \tag{7}$$

The $I_{lpf}$ output of low pass filter 105-1 is sampled several times, e.g., 4, during each symbol period by sample and hold circuit 110-1 reponsive to sample pulses from timing extractor 150. The sampled signal from sample and hold circuit 110-1 is converted to digital form in A/D converter 115-1. In similar fashion, Signal $Q_{lpf}$ is sampled by sample and hold circuit 110-2 and converted to digital form in A/D converter 115-2. Low pass filters 120-1 and 120-2 are matched filters adapted to shape the digital sample outputs of A/D converters 115-1 and 115-2 to minimize intersymbol interference as is well known in the art.

The inphase and quadrature phase signals from filters 120-1 and 120-2 are supplied to differential detector 140 which is adapted to form signals $$I_{diff} = \tfrac{1}{4} \cos(\phi_n - \phi_{n-1}) \tag{8}$$

and $$Q_{diff} = \tfrac{1}{4} \sin(\phi_n - \phi_{n-1}) \tag{9}$$

representative of the difference in phase between successive symbols, i.e., $\phi_n - \phi_{n-1}$. Signals $I_{diff}$ and $Q_{diff}$ corresponding to the phase difference are converted into successive dibits in symbol decision circuit 145.

Figure 7:
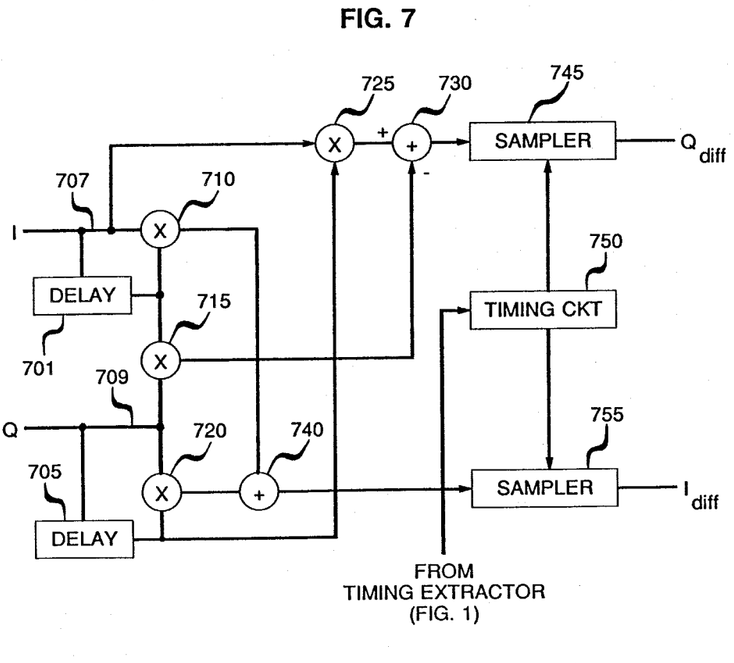
FIG. 7 depicts a more detailed block diagram of a circuit that may be used as the differential detector in FIG. 1.

FIG. 7 shows a more detailed block diagram of a differential detector arrangement that may be used in the demodulator of FIG. 1 in accordance with the disclosure of U.S. Pat. No. 3,991,377 issued to A. D. Salazar et al on Nov. 6, 1976. Referring to FIG. 7, Signal I from low pass filter 120-1 is applied directly to multiplier 710 via lead 707 and through a one symbol period (T) delay 701. The output of multiplier 710 is $$1/8 \sum_n g(t - nT) \sum_n g(t - nT - T) \tag{10}$$

$$[\cos(\phi_n + \phi_{n-1} - 2\theta) + \cos(\phi_n - \phi_{n-1})].$$

Similarly, signal Q from low pass filter 120-2 is applied directly to multiplier 720 via lead 709 and through one period delay 705. The multiplier output is $$1/8 \sum_n g(t - nT) \sum_n g(t - nT - T) \tag{11}$$

$$[\cos(\phi_n - \phi_{n-1}) - \cos(\phi_n + \phi_{n-1} - 2\theta)].$$

The outputs of multipliers 710 and 720 are summed in adder 740 to produce the inphase differential signal $$I_{diff}(t) = \tag{12}$$

$$1/4 \sum_n g(t - nT) \sum_n g(t - nT - T)\cos(\phi_n - \phi_{n-1}).$$

For sampling at times t=nT, $I_{diff}(nT)$ reduces to $$\tfrac{1}{4} \cos \Delta\phi \tag{13}$$

where $\Delta\phi = \phi_n - \phi_{n-1}$.

Multiplier 725 receives the signal I(t) from low pass filter 120-1 and the signal from low pass filter 120-2 delayed one symbol period T, Q(t−T), in delay 705 and forms the product signal $$1/8 \sum_n g(t - nT) \sum_n g(t - nT - T) \tag{14}$$

$$[-\sin(\phi_n + \phi_{n-1} - 2\theta) + \sin(\phi_n - \phi_{n-1})]$$

while Multiplier 715 receives the signal Q(t) from low pass filter 120-2 and the signal from low pass filter 120-1 delayed one symbol period in delay 701, I(t−T), to form the product signal $$1/8 \sum_n g(t - nT) \sum_n g(t - nT - T) \tag{15}$$

-continued $$[-\sin(\theta_n + \theta_{n-1} - 2\theta) - \sin(\phi_n - \phi_{n-1})].$$

The output of multiplier 715 is subtracted from the output of multiplier 725 in adder 730 so that the resultant signal therefrom is $$Q_{diff} = 1/4 \sum_n g(t - nT) \sum_n g(t - nT - T)\sin\Delta\phi. \quad (16)$$

For sampling at times t=nT, $Q_{diff}(nT)$ reduces to $$\tfrac{1}{4} \sin \Delta\phi. \quad (17)$$

Figure 6:
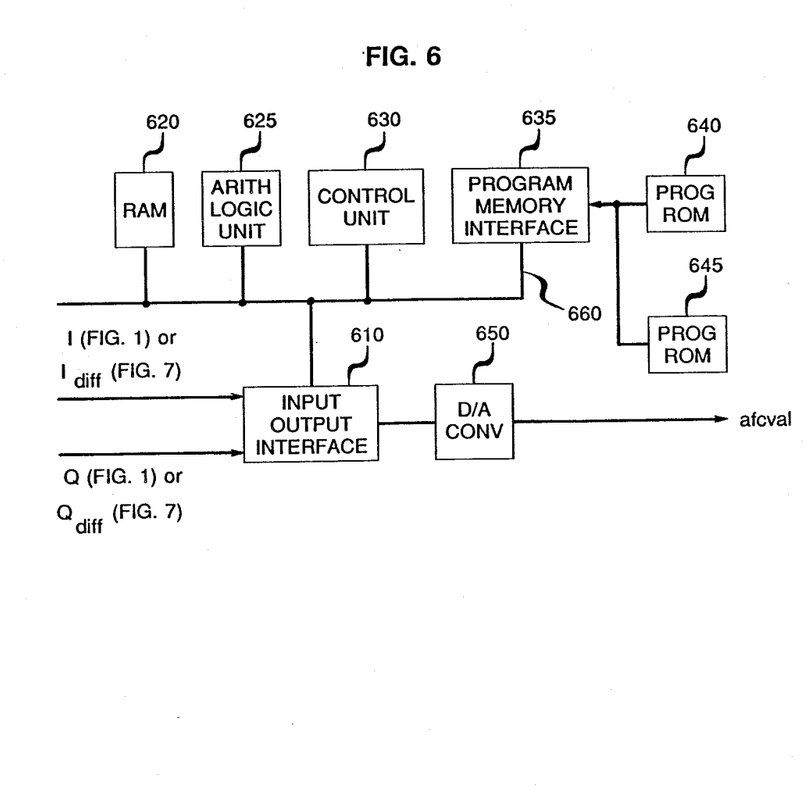
FIG. 6 is a general block diagram of a signal processor that may be used as the differential detector and the AFC carrier frequency acquisition and tracking processor of the circuit of FIG. 1.

Differential detector 140 may alternatively comprise a processing arrangement including a digital signal processor such as the Western Electric type DSP 16 Digital Signal Processor illustrated in simplified form in FIG. 6. Referring to FIG. 6, the processor comprises input output interface 610, random access memory 620, arithmetic logic unit 625, control unit 630, program read only memories 640 and 645, program memory interface circuit 635, bus 660 and D/A converter 650. When programmed to function as differential detector 140, input-output interface 610 is adapted to receive the symbol component signals I and Q from low pass filters 120-1 and 120-2 and to form the signals $I_{diff}$ and $Q_{diff}$. Advantageously, the processor of FIG. 6 may perform both the functions required for generating the $I_{diff}$ and $Q_{diff}$ signals and the operations of AFC carrier acquisition and tracking circuit 155.

Figure 8:
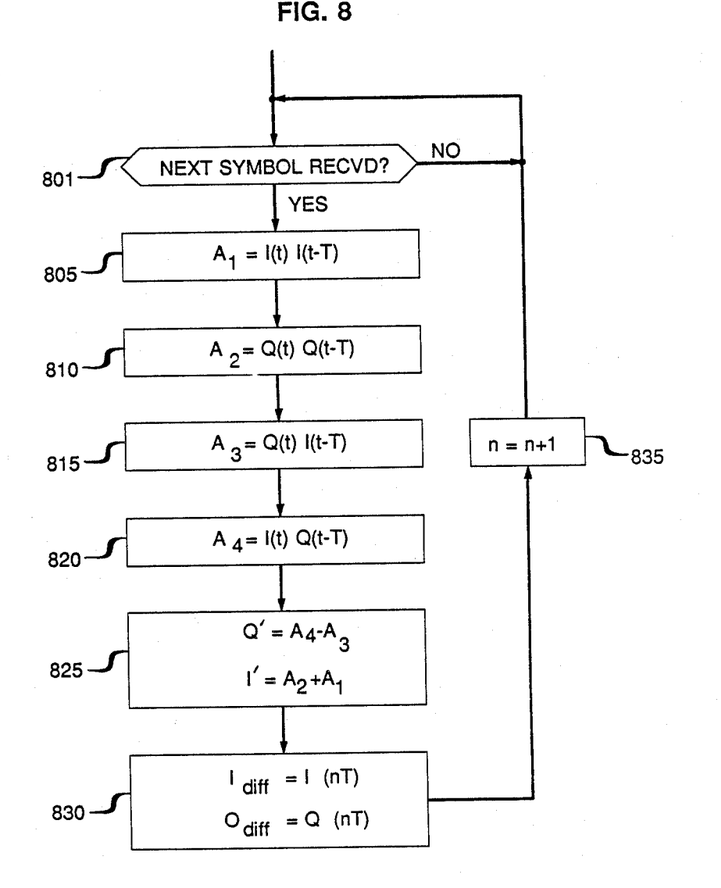
FIG. 8 is a flow chart illustrating the operation of the processor of FIG. 6 as the differential detector of FIG. 1.

FIG. 8 is a flow chart illustrating the operation of the processor of FIG. 6 as a differential detector and corresponds to a set of instructions permanently stored in program read only memory 640 therein. Referring to FIG. 8, the differential detector operation begins in step 805 after a determination that the next symbol component signals have been received (step 801). The arithmetic functions of steps 805, 810, 815 and 820 are then performed to generate component signals $A_1$ through $A_4$. In step 805, signal I(t) for the current symbol n from filter 120-1 is multiplied by the signal I(t−T) of the previous symbol as described with respect to multiplier 710 in FIG. 7. In step 810, signal Q(t) for the current symbol is multiplied by signal Q(t−T) for the previous symbol as done in multiplier 720. The product of signals Q(t) and I(t−T) is produced in step 815 corresponding to multiplier 715 and the product of signals I(t) and Q(t−T) is generated in step 820 corresponding to multiplier 725. A signal I'(t) is generated by subtracting the product of step 815 ($A_3$) from the product signal of step 820 ($A_4$) as described with respect to adder 730 and a signal Q'(t−T) is generated by summing the signals from step 805 ($A_1$) and 810 ($A_2$) in step 825 corresponding to adder 740.

Signals I' and Q' are sampled once each symbol period T to generate signals $I_{diff}$ and $Q_{diff}$ in step 830. Control is then returned to step 801 via symbol count increment step 835. The phase shift between symbol period nT is independent of the sampling time so that the location of the sampling instant is not critical as long as the symbols are identical and the sampling instant is the same for successive symbol periods. Signals $I_{diff}$ and $Q_{diff}$ are processed in symbol decision circuit 145 which outputs the demodulated dibit sequence corresponding to the received signal s(t). In the event that the frequency of local oscillator 125 differs from that of the received signal carrier or appropriate intermediate frequency translation thereof, signals $I_{diff}$ and $Q_{diff}$ include a phase component $\Delta\omega T$ where $\Delta\omega$ is the difference between the received signal carrier frequency and the local oscillator frequency. The phase component $\Delta\omega$ causes phase shifts of the differential inphase and quadrature phase difference signals that result in erroneous operation.

In the circuit of FIG. 1, the received signal s(t) is shifted to baseband and the dibit sequence is determined by processing of the symbols in the resulting baseband signal. To assure proper demodulation, it is necessary to initially set the frequency of local oscillator 125 to the received carrier frequency or the intermediate frequency equivalent and to maintain frequency lock between the received signal and the local oscillator. For the narrow band channels at high carrier frequencies such as used in cellular telephone systems, the deviation of the local oscillator frequency from the carrier frequency must be minimized or a significant error rate may result. In the circuit of FIG. 1, the frequency of local oscillator 125 is controlled by AFC carrier acquisition and tracking processor 155. The AFC carrier acquisition and tracking processor initially supplies a signal to the local oscillator through filter 160 corresponding to its nominal frequency. The deviation of the nominal local oscillator frequency from the carrier frequency may cause a substantial deviation in the signal phase shift of the resulting symbols.

In accordance with the invention, the local oscillator frequency is synchronized to that of the received carrier frequency by processing the detected symbols of a prescribed symbol sequence of a predetermined preamble interval. In PSK arrangements, it is necessary to sample the received signal at precisely known instants to obtain the absolute value of the phases of the I and Q signals. But, as is well known in the art, the phases of the received signal may vary according to channel conditions. It is therefore difficult to adjust the local oscillator frequency on the basis of detected symbols without first ascertaining the proper sampling instants. According to the invention, it is recognized that the phase difference $\Delta\phi$ remains invariant for successive same type symbols, e.g., 0,0 in the preamble even though there are large variations in phase and timing instants. Thus, the successive symbols of a preamble period may be detected and used to adjust the frequency of the local oscillator without regard to the times at which the symbols in the received signal are sampled as long as the sampling rate corresponds to the symbol period.

The prescribed symbol sequence during the preamble interval may be a series of K 0,0 symbols so that the resulting phase shift in the plane of FIG. 2 is $\pi/4$ radians and the expected symbol location is at point 250. The expected symbol location corresponds to that of the symbol assigned to the preamble. Assume for purposes of illustration that both the $I_{diff}$ and $Q_{diff}$ signals are negative so that the received signal phase shift is at point 255 in sector 222 of the phase shift diagram. In order to synchronize the local oscillator frequency to that of the received signal s(t), a preamble interval having a prescribed symbol sequence 0,0 0,0 ... 0,0 is included at the start of signal s(t). The $I_{diff}$ and $Q_{diff}$ signals obtained from differential detector 140 are applied to AFC carrier acquisition and tracking processor 155 which is initially adapted to determine the location of the phase shift corresponding to the prescribed symbol sequence. A signal corresponding to difference between the location of the phase shift obtained from the $I_{diff}$ and $Q_{diff}$ signals and the phase shift location assigned to the prescribed symbol sequence in the phase shift plane representation of FIG. 2 is formed and supplied to local oscillator 125. The frequency of local oscillator 125 is thereby altered to bring the received symbol phase shift into the proper quadrant. Subsequent to the preamble period, the AFC carrier acquisition and tracking processor is adapted to track the frequency of the carrier by periodically analyzing the $I_{diff}$ and $Q_{diff}$ signals so that the local oscillator frequency matches that of the received signal s(t).

Figure 3:
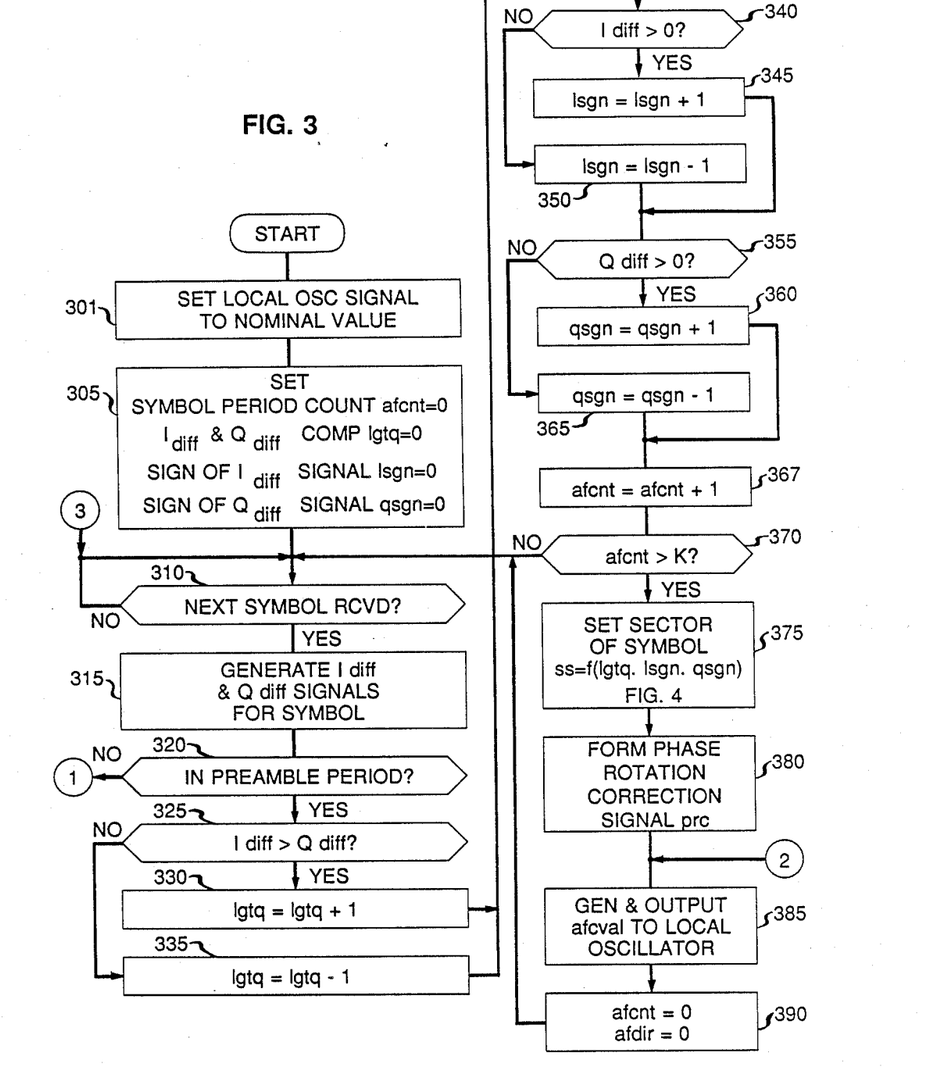
FIGS. 3, 4 and 5 are flow charts that illustrate the operation of the AFC carrier frequency acquisition and tracking processor of the circuit of FIG. 1.
Figure 4:
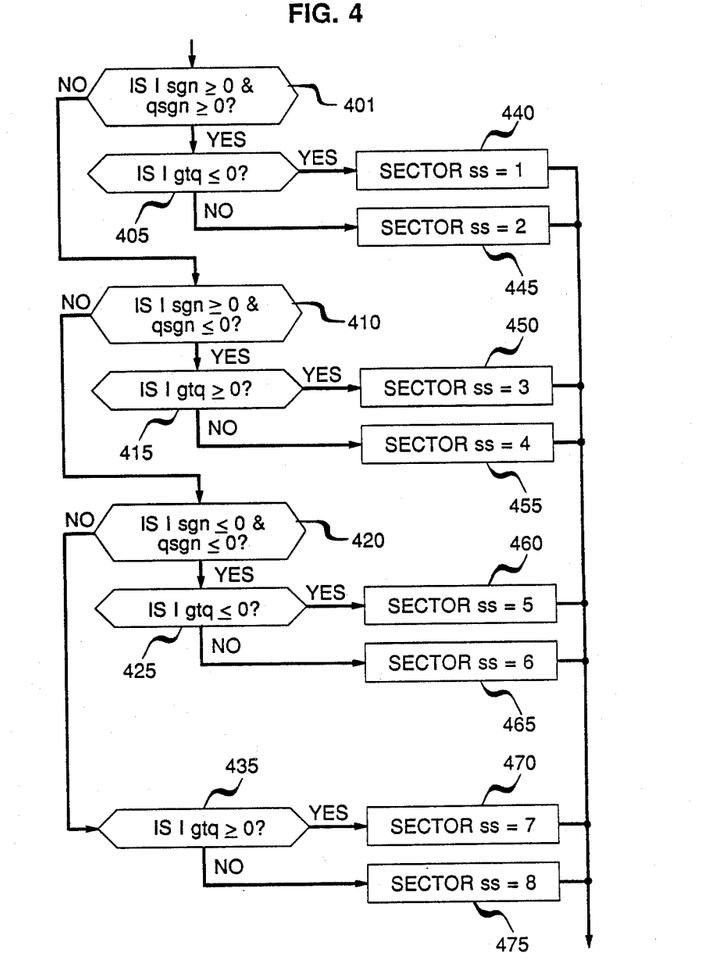
Figure 5:
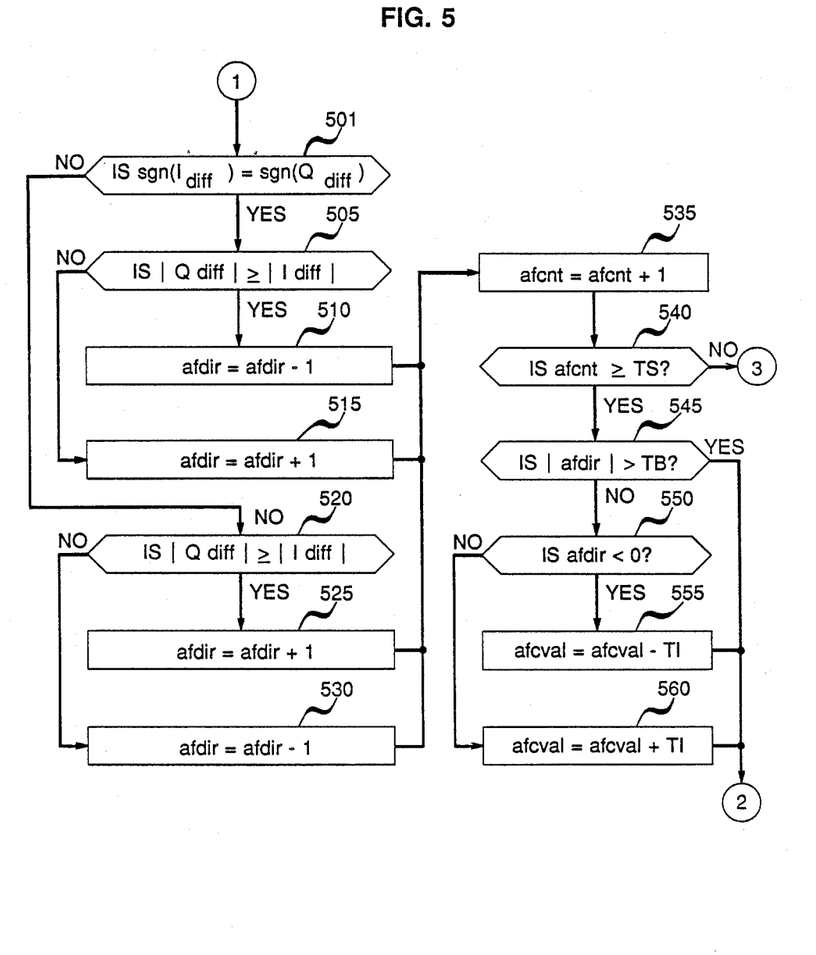

The processing arrangement of FIG. 6 may be used as AFC carrier acquisition and tracking processor 155 in FIG. 1 by having its operation sequence determined by a set of permanently stored program instructions in accordance with the flow charts of FIGS. 3, 4 and 5. Referring to FIG. 6, input-output interface 610 is adapted to receive the signals $I_{diff}$ and $Q_{diff}$ from the differential detector of FIG. 7 or from memory if the processing arrangement according to FIG. 8 is used. These signals are available to the processor of FIG. 6 each symbol period T. In the carrier acquisition and tracking mode, the processor produces an oscillator control signal afcval which is output via interface 610, D/A converter 650 to low pass filter 160 of FIG. 1. Program read only memory 645 stores the instructions illustrated in the flow charts of FIGS. 3, 4 and 5. Arithmetic logic 625 performs the processing of the $I_{diff}$ and $Q_{diff}$ signals to obtain a frequency correction signal at the end of the preamble interval. Control unit 630 receives the instruction signals from the program read only memories via program memory interface 635 and forms processing control signals therefrom. Random access memory 620 stores the $I_{diff}$ and $Q_{diff}$ signals for the symbol sequence of the preamble interval and other data signals needed for processing and bus 660 transfers data and control signals between the other processing units.

FIG. 3 is a flow chart illustrating the operation of the processor of FIG. 6. During the step of a transmission, e.g., a connection between cellular telephone base station and a mobile station, the mobile station receives a signal designating the channel to which its receiver is to be set. Step 301 of FIG. 3 is entered and a signal afcval corresponding to the local oscillator nominal frequency is produced and output thereto. The symbol period count signal afcnt, the $I_{diff}$ and $Q_{diff}$ compare signal igtq, the sign of $I_{diff}$ signal isgn and the sign of $Q_{diff}$ signal qsgn are initially set to zero as per step 305. Control unit 630 then determines if the next symbol has been received (step 310), e.g., though an interrupt line or other arrangement not shown.

The acquisition and tracking processor operation in FIG. 6 is then halted (step 315) during the formation of the $I_{diff}$ and $Q_{diff}$ signals in differential detector 140 as previously described with respect to FIGS. 1 and 7 or FIGS. 1 and 8. The $I_{diff}$ signal corresponds to cos ($\Delta\phi$) and is representative of the inphase I phase difference component of the symbol in the phase shift plane of FIG. 2 while the $Q_{diff}$ signal corresponds to sin ($\Delta\phi$) and is representative of the quadrature phase Q phase difference component of the symbol in the phase shift plane of FIG. 2. Decision step 320 is then entered wherein it is determined whether the preamble interval portion of the received signal is being received. During the preamble interval, steps 325 through 370 are iterated for the preamble symbols and the frequency correction signal afcval is derived in steps 375 through 385.

The absolute values of signals $I_{diff}$ and $Q_{diff}$ are compared in decision step 325. If the absolute value of $I_{diff}$ is greater than the absolute value of $Q_{diff}$, comparison index signal igtq is incremented by one (step 330). Otherwise, signal igtq is decremented by one (step 335). Signal $I_{diff}$ is then compared to zero in decision step 340 to determine its sign. For $I_{diff}$ greater than zero, index signal isgn is incremented (step 345). If signal $I_{diff}$ is not positive, signal isgn is decremented (step 350). The sign of signal $Q_{diff}$ is then determined in decision step 355. For $Q_{diff}$ greater than zero, index signal qsgn is incremented (step 360). A non-positive sign causes signal qsgn to be decremented (step 365). In each iteration from step 325 to step 370, the sector in which the received symbol is located on the phase shift plane is detected. For example, if signals $I_{diff}$ and $Q_{diff}$ are both negative, the symbol is in quadrant 220 in the phase shift plane of FIG. 2. Further, the absolute value of signal $I_{diff}$ is greater than the absolute value of signal $Q_{diff}$, the symbol location is restricted to sector or octant 222. Subsequent to the adjustment of the location index signals for the present received symbol, the received symbol count signal afcnt is incremented (step 367) and control is passed to step 310 via decision step 370.

The steps of the received symbol location loop from step 325 to step 370 are repeated for each prescribed symbol of the preamble interval until the symbol index signals have been processed for the Kth symbol. At this time, the sector of the symbol is set in step 375 as shown in greater detail in FIG. 4. Referring to FIG. 4, it is determined if sign index signals isgn and qsgn are both positive whereby the received symbol is located in quadrant 201 in decision step 401. If both sign indices are positive, step 405 is entered and the sector of the quadrant is fixed by determining whether the igtq index is negative or positive. A negative index places the received symbol in octant 202 which is indicated by setting sector signal ss to 1 (step 440). A positive index igtq causes sector signal ss to be set to 2 (step 445) indicating the received symbol is in octant 204.

In the event that both index signals isgn and qsgn are not positive, decision step 410 is entered from decision step 401 and a determination is made whether signal isgn is positive while signal qsgn is negative. If this condition is met, the received symbol is located in quadrant 230. The sector determination is then made in decision step 415 so that sector signal ss becomes either 3 (step 450) or 4 (step 455) responsive to the igtq index signal. Decision step 420 is entered from step 410 when the condition of step 410 is not met and the isgn and qsgn index signals are tested to determine whether both are negative. If so, the received symbol is located in quadrant 220 and the index signal igtq is tested in step 425 to determine whether sector signal ss is set to 5 in step 460 or to 6 in step 465. Step 435 is entered from step 420 when the conditions therein are not satisfied since signal isgn is negative and signal qsgn is positive corresponding to quadrant 210. Sector signal ss is set to 7 (step 470) if signal igtq is positive in step 435. Otherwise sector signal ss is set to 8 in step 475.

After a value is selected for received symbol sector location ss in one of steps 440 through 475, a phase rotation correction signal prc is formed in step 380 of FIG. 3 by table lookup or other means well known in the art in accordance with Table 1

TABLE 1

| Sector Signal ss | Phase Rotation Correction prc |
|---|---|
| 1 | $-\frac{1}{8}\pi$ |
| 2 | $+\frac{1}{8}\pi$ |
| 3 | $+\frac{3}{8}\pi$ |
| 4 | $+\frac{5}{8}\pi$ |
| 5 | $+\frac{7}{8}\pi$ |
| 6 | $-\frac{7}{8}\pi$ |
| 7 | $-\frac{5}{8}\pi$ |
| 8 | $-\frac{3}{8}\pi$ |

When the sector signal ss is 1, the symbol location is shifted $\pi/8$ clockwise within quadrant 201. A sector signal ss=2 causes the symbol location to be shifted counter-clockwise $\pi/8$ within quadrant 201. A counter-clockwise shift of $3\pi/8$ from sector 232 to quadrant 201 results from a sector signal ss=3. A counter-clockwise shift of $5\pi/8$ from sector 234 to quadrant 201 is obtained for a sector signal ss=4. When a sector signal 5 occurs, there is a counter-clockwise shift of $7\pi/8$ from sector 224 to quadrant 201. A sector signal of 6 provides a clockwise shift of $7\pi/8$ from sector 222 to quadrant 201. A clockwise shift of $5\pi/8$ from sector 212 to quadrant 201 occurs responsive to a sector signal of 7 and a clockwise shift of $3\pi/8$ from sector 214 to quadrant 201 is obtained responsive to a sector signal of 8.

A signal afcval is then produced in processors 625 and 630 and output to local oscillator 125 of FIG. 1 via D/A converter 650 and low pass filter 160 (step 385). Signal afcval changes the local oscillator frequency so that the received signal symbol phase shift is moved to within $\pi/8$ radians of line 206 in quadrant 201 of FIG. 2. Signals afcnt and afdir are reset to zero in step 390 preparatory to the frequency tracking operations and program control is returned to decision step 310 to wait for the next symbol. When the preamble period is terminated, the local oscillator frequency is such that the phase shift in FIG. 2 is within $\pi/8$ radians of the desired phase shift. At this time AFC processor 155 is rendered operative to track the local oscillator frequency to correct deviations of local oscillator frequency responsive to all possible symbols that may occur in received signal s(t). The tracking arrangement is illustrated in FIGS. 3 and 5.

Step 501 of FIG. 5 is entered via steps 310, 315 and 320 upon termination of the preamble period. In step 501, the sign of signal $I_{diff}$ is compared to the sign of signal $Q_{diff}$. If the signs are the same, the symbol phase shift is located in either quadrant 201 or quadrant 220 of FIG. 2. In these quadrants, the local oscillator frequency is too high when the magnitude of the quadrature component $Q_{diff}$ is greater than the magnitude of the inphase component $I_{diff}$ and is too low if the magnitude of $Q_{diff}$ is less than the magnitude of the inphase component $I_{diff}$. The magnitudes of $Q_{diff}$ and $I_{diff}$ are compared in step 505. Responsive to a decision that the frequency is too high in step 505, signal afdir is decremented in step 510. A decision that the frequency is too low in step 505 causes signal afdir to be incremented in step 515.

When the signs of symbol component signals $I_{diff}$ and $Q_{diff}$ are different, the symbol phase shift is located in quadrant 210 or quadrant 230 and decision step 520 is entered from step 501. For a symbol located in quadrant 210 or quadrant 230, the local oscillator frequency is too high when the magnitude of the quadrature component $Q_{diff}$ is less than the magnitude of the inphase component $I_{diff}$ and is too low if the magnitude of $Q_{diff}$ is greater than the magnitude of the inphase component $I_{diff}$. Consequently, signal afdir is incremented in step 525 for $|Q_{diff}|$ greater than $|I_{diff}|$ in step 520 or is decremented in step 530 for $|Q_{diff}|$ less than $|I_{diff}|$ in step 520. After signal afdir has been adjusted in one of steps 510, 515, 525 or 530, the symbol count index signal afcnt is incremented in step 535 and then compared to a predetermined number TS in decision step 540. Until TS symbols have been processed, step 310 is reentered from step 540 and signal afdir is adjusted for the next symbol.

After the processing of TS symbols, step 545 is entered in which the magnitude of the adjustment signal afdir is tested to determine if is outside an acceptable frequency tracking band TB. In the event that signal afdir falls outside the track band TB, the sign of afdir is tested in decision step 550. A positive value of signal afdir results in oscillator control signal afcval being incremented by a fixed value T1 in step 560 so as to increase the low local oscillator frequency. A negative value for signal afdir in step 550 causes signal afcval to be decremented by a value T1 in step 555 to decrease the high local oscillator frequency. T1 may be fixed or a function of afdir. For values of afdir that are within the track band TB, no change is made to the oscillator control signal afcval. Control is passed from one of steps 545, 555 or 560 to step 385 in which the signal afcval is output to the local oscillator. The frequency adjustment signal afdir and the symbol count index signal are reset to zero in step 390 and step 310 is reentered for receipt of the next symbol. The frequency tracking operation of FIGS. 3 and 5 are performed for the successive symbols of the received signal s(t) occurring after the preamble interval.

The invention has been described with reference to an illustrative embodiment thereof. It is apparent, however, to one skilled in the art that various modifications and changes may be made without departing from the spirit and scope of the invention.

I claim:

1. In an MDPSK communication receiver including a frequency source, means for translating a received MDPSK signal having inphase I and quadrature phase Q components to a prescribed band and means for demodulating the prescribed band MDPSK signal, a method for synchronizing the frequency of the receiver frequency source with the carrier frequency of the received MDPSK signal comprising in the steps of:

forming a signal representative of the inphase component of the phase difference between immediately successive received symbols for each symbol of the prescribed band MDPSK signal;

forming a signal representative of the quadrature phase component of the phase difference between immediately successive received symbols for each symbol of the prescribed band MDPSK signal;

defining a preamble interval in the received MDPSK signal during which a prescribed sequence of symbols is received;

comparing the inphase difference component signals of the symbols of the preamble interval with the quadrature phase difference component signals of the symbols of the preamble interval to form at least one signal representative of a predetermined relationship between the inphase difference component signals and the quadrature phase difference component signals of the preamble interval; and adjusting the frequency of the receiver frequency source responsive to the at least one predetermined relationship signal.

2. In an MDPSK communication receiver including a frequency source, means for translating a received MDPSK signal having inphase I and quadrature phase Q components to a prescribed band and means for demodulating the prescribed band MDPSK signal, a method for synchronizing the frequency of the receiver frequency source with the carrier frequency of the received MDPSK signal according to claim 1, wherein the sequence of prescribed symbols of the preamble interval is a sequence of identical symbols each having an assigned location in a phase shift plane representation.

3. In an MDPSK communication receiver including a frequency source, means for translating a received MDPSK signal having inphase I and quadrature phase Q components to a prescribed band and means for demodulating the prescribed band MDPSK signal, a method for synchronizing the frequency of the receiver frequency source with the carrier frequency of the received MDPSK signal according to claim 2 wherein the prescribed band is the baseband.

4. In an MDPSK communication receiver including a frequency source, means for translating a received MDPSK signal having inphase I and quadrature phase Q components to a prescribed band and means for demodulating the prescribed band MDPSK signal, a method for synchronizing the frequency of the receiver frequency source with the carrier frequency of the received MDPSK signal according to claim 3 wherein the MDPSK signal is a QDPSK signal.

5. In an MDPSK communication receiver including a frequency source, means for translating a received MDPSK signal having inphase I and quadrature phase Q components to a prescribed band and means for demodulating the prescribed band MDPSK signal, a method for synchronizing the frequency of the receiver frequency source with the carrier frequency of the received MDPSK signal according to claim 4 wherein the step of comparing the inphase difference component signals of the preamble interval with the quadrature difference component signals of the preamble interval comprises the steps of:
for each symbol of the prescribed sequence of symbols of the preamble interval
generating a signal representative of the absolute value of the inphase difference component signal relative to the absolute value of the quadrature phase component signal of the symbol,
generating a signal representative of the sign of the inphase difference component signal of the symbol, and
generating a signal representative of the quadrature phase difference component signal of the symbol.

6. In an MDPSK communication receiver including a frequency source, means for translating a received MDPSK signal having inphase I and quadrature phase Q components to a prescribed band and means for demodulating the prescribed band MDPSK signal, a method for synchronizing the frequency of the receiver frequency source with the carrier frequency of the received MDPSK signal according to claim 5 wherein the step of adjusting the frequency of the receiver frequency source comprises the steps of:
generating a first signal (igtq) representative of the difference between the number of symbols in the preamble interval for which the absolute value of the inphase difference component is greater than the absolute value of the quadrature phase difference component and the number of symbols for which the absolute value of the inphase difference component is equal to or less than the absolute value of the quadrature phase difference component,
generating a second signal (isgn) representative of the difference between the number of symbols in the preamble interval for which the inphase difference component is positive and the number of symbols in the preamble interval for which the inphase difference component is negative,
generating a third signal (qsgn) representative of the difference between the number of symbols in the preamble interval for which the quadrature phase difference component is positive and the number of symbols in the preamble interval for which the quadrature phase difference component is negative, and
producing a signal representative of the location of the received symbol in the phase shift plane representation responsive to the first (igtq), second (isgn) and third (qsgn) signals.

7. In an MDPSK communication receiver including a frequency source, means for translating a received MDPSK signal having inphase I and quadrature phase Q components to a prescribed band and means for demodulating the prescribed band MDPSK signal, a method for synchronizing the frequency of the receiver frequency source with the carrier frequency of the received MDPSK signal according to claim 1 further comprising the steps of:
partitioning the baseband MDPSK signal subsequent to the preamble interval into groups of K symbols,
for each symbol of the present group of K symbols,
forming a plurality of signals each representative of a prescribed relationship between the inphase difference component for the symbol and the quadrature phase difference component for the symbol,
generating a signal representative of difference between the frequency of the receiver frequency source and the frequency of the carrier of the received MDPSK signal responsive to the plurality of prescribed relationship signals for the symbol,
combining the frequency difference signals of the group of K symbols, and
adjusting the frequency of the receiver frequency source responsive to the combined frequency difference signals for the group of K symbols.

8. In an MDPSK communication receiver including a frequency source, means for translating a received MDPSK signal having inphase I and quadrature phase Q components to a prescribed band and means for demodulating the prescribed band MDPSK signal, a method for synchronizing the frequency of the receiver frequency source with the carrier frequency of the received MDPSK signal according to claim 7 wherein the step of forming a plurality of signals each representative of a prescribed relationship between the inphase difference component for the symbol and the quadrature phase difference component for the symbol comprises the steps of:
forming a signal representative of the sign of the inphase difference component signal relative to the sign of the quadrature phase difference component signal; and forming a signal representative of the absolute value of the inphase difference component signal relative to the absolute value of the quadrature phase difference component signal.

9. In an MDPSK communication receiver including a frequency source, means for translating a received MDPSK signal having inphase I and quadrature phase Q components to a prescribed band and means for demodulating the prescribed band MDPSK signal, a method for synchronizing the frequency of the receiver frequency source with the carrier frequency of the received MDPSK signal according to claim 8 wherein:

the step of generating a signal representative of difference between the frequency of the receiver frequency source and the frequency of the carrier of the received MDPSK signal comprises generating a signal representative of the location of the symbol in the phase shift plane representation relative to the location of a symbol having the same sign representative signals and the absolute value of its inphase difference component equal to the absolute value of its quadrature phase difference component responsive to the signal representative of the sign of the inphase difference component signal relative to the sign of the quadrature phase difference component signal and the signal representative of the absolute value of the inphase difference component signal relative to the absolute value of the quadrature phase difference component signal.

10. In an MDPSK communication receiver including a frequency source, means for translating a received MDPSK signal having inphase I and quadrature phase Q components to a prescribed band and means for demodulating the prescribed band MDPSK signal, a method for synchronizing the frequency of the receiver frequency source with the carrier frequency of the received MDPSK signal according to claim 9 wherein the step of combining the frequency difference signals of the group of K symbols comprises summing the signals representative of the locations of the symbols of the group.

11. In an MDPSK communication receiver including a frequency source, means for translating a received MDPSK signal having inphase I and quadrature phase Q components to a prescribed band and means for demodulating the prescribed band MDPSK signal, apparatus for synchronizing the frequency of the receiver frequency source with the carrier frequency of the received MDPSK signal comprising:

means responsive to the symbols of the prescribed band MDPSK signal for forming a signal representative of the inphase component of the phase difference between immediately successive received symbols for each symbol of the prescribed band MDPSK signal;

means responsive to the symbols of the prescribed band MDPSK signal for forming a signal representative of the quadrature phase component of the phase difference between immediately successive received symbols for each symbol of the prescribed band MDPSK signal;

means for defining a preamble interval in the received MDPSK signal during which a prescribed sequence of symbols is received;

means for comparing the inphase difference component signals of the symbols of the preamble interval with the quadrature difference component signals of the symbols of the preamble interval to form at least one signal representative of a predetermined relationship between the inphase difference component signals and the quadrature phase difference component signals of the preamble interval; and means responsive to the at least one predetermined relationship signal for adjusting the frequency of the receiver frequency source.

12. In an MDPSK communication receiver including a frequency source, means for translating a received MDPSK signal having inphase I and quadrature phase Q components to a prescribed band and means for demodulating the prescribed band MDPSK signal, apparatus for synchronizing the frequency of the receiver frequency source with the carrier frequency of the received MDPSK signal according to claim 11 wherein the sequence of prescribed symbols of the preamble interval is a sequence of identical symbols each having an assigned location in a phase shift plane representation.

13. In an MDPSK communication receiver including a frequency source, means for translating a received MDPSK signal having inphase I and quadrature phase Q components to a prescribed band and means for demodulating the prescribed band MDPSK signal, apparatus for synchronizing the frequency of the receiver frequency source with the carrier frequency of the received MDPSK signal according to claim 12 wherein the prescribed band is the baseband.

14. In an MDPSK communication receiver including a frequency source, means for translating a received MDPSK signal having inphase I and quadrature phase Q components to a prescribed band and means for demodulating the prescribed band MDPSK signal, apparatus for synchronizing the frequency of the receiver frequency source with the carrier frequency of the received MDPSK signal according to claim 13 wherein the MDPSK signal is a QDPSK signal.

15. In an MDPSK communication receiver including a frequency source, means for translating a received MDPSK signal having inphase I and quadrature phase Q components to a prescribed band and means for demodulating the prescribed band MDPSK signal, apparatus for synchronizing the frequency of the receiver frequency source with the carrier frequency of the received MDPSK signal according to claim 14 wherein the means for comparing the inphase difference component signals of the preamble interval with the quadrature difference component signals of the preamble interval comprises:

means responsive to the inphase and quadrature phase difference components of each symbol in the preamble interval for generating a signal representative of the absolute value of the inphase I difference component signal relative to the absolute value of the quadrature phase difference component signal of the symbol, means responsive to the inphase difference component of each symbol in the preamble interval generating a signal representative of the sign of the inphase difference component signal of the symbol, and means responsive to the quadrature phase difference component of each symbol in the preamble interval for generating a signal representative of the sign of the quadrature phase difference component signal of the symbol.

16. In an MDPSK communication receiver including a frequency source, means for translating a received MDPSK signal having inphase I and quadrature phase Q components to a prescribed band and means for demodulating the prescribed band MDPSK signal, apparatus for synchronizing the frequency of the receiver frequency source with the carrier frequency of the received MDPSK signal according to claim 15 wherein the means for adjusting the frequency of the receiver frequency source comprises:

means responsive to the signal representative of the absolute value of the inphase I difference component signal relative to the absolute value of the quadrature phase Q difference component signal of each symbol for generating a first signal (igtq) representative of the difference between the number of symbols in the preamble interval for which the absolute value of the inphase difference component is greater than the absolute value of the quadrature phase difference component and the number of symbols for which the absolute value of the inphase difference component is equal to or less than the absolute value of the quadrature phase difference component, means responsive to the signals representative of the sign of the inphase difference component signals of the symbols of the preamble interval for generating a second signal (isgn) representative of the difference between the number of symbols in the preamble interval for which the inphase difference component is positive and the number of symbols in the preamble interval for which the inphase difference component is negative, means responsive to the signals representative of the signs of the quadrature phase difference component signals of the symbols of the preamble interval for generating a third signal (qsgn) representative of the difference between the number of symbols in the preamble interval for which the quadrature phase difference component is positive and the number of symbols in the preamble interval for which the quadrature phase difference component is negative, and means responsive to the first (igtq), second (isgn) and third (qsgn) signals for producing a signal representative of the location of the received symbol in the phase shift plane representation.

17. In an MDPSK communication receiver including a frequency source, means for translating a received MDPSK signal having inphase I and quadrature phase Q components to a prescribed band and means for demodulating the prescribed band MDPSK signal, apparatus for synchronizing the frequency of the receiver frequency source with the carrier frequency of the received MDPSK signal according to claim 11 further comprising:

means for partitioning the baseband QDPSK signal subsequent to the preamble interval into groups of K symbols, means responsive to the inphase and quadrature phase difference components of each symbol of the present group of K symbols for forming a plurality of signals each representative of a prescribed relationship between the inphase difference component for the symbol and the quadrature phase difference component for the symbol, means responsive to the plurality of prescribed relationship signals for each symbol for generating a signal representative of difference between the frequency of the receiver frequency source and the frequency of the carrier of the received QDPSK signal, means for combining the frequency difference signals of the group of K symbols, and means responsive to the combined frequency difference signals for the group of K symbols for adjusting the frequency of the receiver frequency source.

18. In an MDPSK communication receiver including a frequency source, means for translating a received MDPSK signal having inphase I and quadrature phase Q components to a prescribed band and means for demodulating the prescribed band MDPSK signal, apparatus for synchronizing the frequency of the receiver frequency source with the carrier frequency of the received MDPSK signal according to claim 17 wherein the means for forming a plurality of signals each representative of a prescribed relationship between the inphase difference component for the symbol and the quadrature phase difference component for the symbol comprises:

means responsive to the inphase and quadrature phase difference components of each symbol of the group of K symbols for forming a signal representative of the sign of the inphase difference component signal relative to the sign of the quadrature phase difference component signal; and means responsive to the inphase and quadrature phase difference components of each symbol of the group of K symbols for forming a signal representative of the absolute value of the inphase difference component signal relative to the absolute value of the quadrature phase difference component signal.

19. In an MDPSK communication receiver including a frequency source, means for translating a received MDPSK signal having inphase I and quadrature phase Q components to a prescribed band and means for demodulating the prescribed band MDPSK signal, apparatus for synchronizing the frequency of the receiver frequency source with the carrier frequency of the received MDPSK signal according to claim 18 wherein:

the means for generating a signal representative of the difference between the frequency of the receiver frequency source and the frequency of the carrier of the received QDPSK signal comprises means responsive to the signal representative of the sign of the inphase difference component signal relative to the sign of the quadrature phase difference component signal and the signal representative of the absolute value of the inphase difference component signal relative to the absolute value of the quadrature phase difference component signal of each symbol for generating a signal representative of the location of each symbol in the phase shift plane representation relative to the location of a symbol having the same sign representative signals and its absolute value of its inphase difference component equal to the absolute value of its quadrature phase difference component.

20. In an MDPSK communication receiver including frequency source, means for translating a received MDPSK signal having inphase I and quadrature phase Q components to a prescribed band and means for demodulating the prescribed band MDPSK signal, apparatus for synchronizing the frequency of the receiver frequency source with the carrier frequency of the received MDPSK signal according to claim 19 wherein the means for combining the frequency difference signals of the group of K symbols comprises means for summing the signals representative of the locations of the symbols of the group in the phase shift plane representation.

21. In an MDPSK communication receiver including a frequency source, means for translating a received MDPSK signal having inphase I and quadrature phase Q components to a prescribed band and means for demodulating the prescribed band MDPSK signal, a method for tracking the receiver frequency source to the MDPSK signal carrier frequency comprising the steps of:
forming a signal representative of the inphase component of the phase difference between immediately successive received symbols for each symbol of the prescribed band MDPSK signal;
forming a signal representative of the quadrature phase component of the phase difference between immediately successive received symbols for each symbol of the prescribed band MDPSK signal,
partitioning the prescribed band MDPSK signal into groups of K symbols,
for each symbol of the present group of K symbols, forming a plurality of signals each representative of a prescribed relationship between the inphase difference component for the symbol and the quadrature phase difference component for the symbol,
generating a signal representative of difference between the frequency of the receiver frequency source and the frequency of the carrier of the received MDPSK signal responsive to the plurality of prescribed relationship signals for the symbol,
combining the frequency difference signals of the group of K symbols, and
adjusting the frequency of the receiver frequency source responsive to the combined frequency difference signals for the group of K symbols.

22. In an MDPSK communication receiver including a frequency source, means for translating a received MDPSK signal having inphase I and quadrature phase Q components to a prescribed band and means for demodulating the prescribed band MDPSK signal, a method for tracking the receiver frequency source to the MDPSK signal carrier frequency according to claim 21 wherein the prescribed band is the baseband.

23. In an MDPSK communication receiver including a frequency source, means for translating a received MDPSK signal having inphase I and quadrature phase Q components to a prescribed band and means for demodulating the prescribed band MDPSK signal, a method for tracking the receiver frequency source to the MDPSK signal carrier frequency according to claim 22 wherein the MDPSK signal is a QDPSK signal.

24. In an MDPSK communication receiver including a frequency source, means for translating a received MDPSK signal having inphase I and quadrature phase Q components to a prescribed band and means for demodulating the prescribed band MDPSK signal, a method for tracking the receiver frequency source to the MDPSK signal carrier frequency according to claim 23 wherein the step of forming a plurality of signals each representative of a prescribed relationship between the inphase difference component for the symbol and the quadrature phase difference component for the symbol comprises the steps of:
forming a signal representative of the sign of the inphase difference component signal relative to the sign of the quadrature phase difference component signal; and
forming a signal representative of the absolute value of the inphase difference component signal relative to the absolute value of the quadrature phase difference component signal.

25. In an MDPSK communication receiver including a frequency source, means for translating a received MDPSK signal having inphase I and quadrature phase Q components to a prescribed band and means for demodulating the prescribed band MDPSK signal, a method for tracking the receiver frequency source to the MDPSK signal carrier frequency according to claim 24 wherein the step of generating a signal representative of difference between the frequency of the receiver frequency source and the frequency of the carrier of the received MDPSK signal comprises
generating a signal representative of the location of the present symbol in the phase shift plane representation relative to the location of a symbol having the same sign representative signals and the absolute value of its inphase difference component equal to the absolute value of its quadrature phase difference component responsive to the signal representative of the sign of the inphase difference component signal relative to the sign of the quadrature phase difference component signal and the signal representative of the absolute value of the inphase difference component signal relative to the absolute value of the quadrature phase difference component signal.

26. In an MDPSK communication receiver including a frequency source, means for translating a received MDPSK signal having inphase I and quadrature phase Q components to a prescribed band and means for demodulating the prescribed band MDPSK signal, a method for tracking the receiver frequency source to the MDPSK signal carrier frequency according to claim 25 wherein the step of combining the frequency difference signals of the group of K symbols comprises summing the signals representative of the locations of the symbols of the group.

27. In an MDPSK communication receiver including a frequency source, means for translating a received MDPSK signal having inphase I and quadrature phase Q components to a prescribed band and means for demodulating the prescribed band MDPSK signal, apparatus for tracking the receiver frequency source to the MDPSK signal carrier frequency comprising:
means responsive to the symbols of the prescribed band MDPSK signal for forming a signal representative of the inphase component of the phase difference between immediately successive received symbols for each symbol of the prescribed band MDPSK signal;
means responsive to responsive to the symbols of the prescribed band MDPSK signal forming a signal representative of the quadrature phase component of the phase difference between immediately successive received symbols for each symbol of the prescribed band MDPSK signal;
means for partitioning the prescribed band MDPSK signal into groups of K symbols,
means operative for each symbol of the present group of K symbols for forming a plurality of signals each representative of a prescribed relationship between the inphase difference component for the symbol and the quadrature phase difference component for the symbol, means operative for each symbol of the present group of K symbols for generating a signal representative of difference between the frequency of the receiver frequency source and the frequency of the carrier of the received MDPSK signal responsive to the plurality of prescribed relationship signals for the symbol, means for combining the frequency difference signals of the group of K symbols, and means responsive to the combined frequency difference signals for the group of K symbols adjusting the frequency of the receiver frequency source.

28. In an MDPSK communication receiver including a frequency source, means for translating a received MDPSK signal having inphase I and quadrature phase Q components to a prescribed band and means for demodulating the prescribed band MDPSK signal, apparatus for tracking the receiver frequency source to the MDPSK signal carrier frequency according to claim 27 wherein the prescribed band is the baseband.

29. In an MDPSK communication receiver including a frequency source, means for translating a received MDPSK signal having inphase I and quadrature phase Q components to a prescribed band and means for demodulating the prescribed band MDPSK signal, apparatus for tracking the receiver frequency source to the MDPSK signal carrier frequency according to claim 28 wherein the MDPSK signal is a QDPSK signal.

30. In an MDPSK communication receiver including a frequency source, means for translating a received MDPSK signal having inphase I and quadrature phase Q components to a prescribed band and means for demodulating the prescribed band MDPSK signal, apparatus for tracking the receiver frequency source to the MDPSK signal carrier frequency according to claim 29 wherein the means for forming a plurality of signals each representative of a prescribed relationship between the inphase difference component for the symbol and the quadrature phase difference component for the symbol comprises:

means responsive to the inphase and quadrature phase difference component signals for forming a signal representative of the sign of the inphase difference component signal relative to the sign of the quadrature phase difference component signal; and means responsive to the inphase and quadrature phase difference component signals for forming a signal representative of the absolute value of the inphase difference component signal relative to the absolute value of the quadrature phase difference component signal.

31. In an MDPSK communication receiver including a frequency source, means for translating a received MDPSK signal having inphase I and quadrature phase Q components to a prescribed band and means for demodulating the prescribed band MDPSK signal, apparatus for tracking the receiver frequency source to the MDPSK signal carrier frequency according to claim 30 wherein the means for generating a signal representative of difference between the frequency of the receiver frequency source and the frequency of the carrier of the received MDPSK signal comprises means responsive to the signal representative of the sign of the inphase difference component signal relative to the sign of the quadrature phase difference component signal and the signal representative of the absolute value of the inphase difference component signal relative to the absolute value of the quadrature phase difference component signal of each symbol for generating a signal representative of the location of the present symbol in the phase shift plane representation relative to the location of a symbol having the same sign representative signals and the absolute value of its inphase difference component equal to the absolute value of its quadrature phase difference component.

32. In an MDPSK communication receiver including a frequency source, means for translating a received MDPSK signal having inphase I and quadrature phase Q components to a prescribed band and means for demodulating the prescribed band MDPSK signal, apparatus for tracking the receiver frequency source to the MDPSK signal carrier frequency according to claim 31 wherein the means for combining the frequency difference signals of the group of K symbols comprises means for summing the signals representative of the locations of the symbols of the group.

* * * * *